(12) United States Patent
Saito et al.

(10) Patent No.: US 11,616,929 B2
(45) Date of Patent: Mar. 28, 2023

(54) ELECTRONIC APPARATUS AND METHOD OF CONTROLLING THE SAME, AND STORAGE MEDIUM

(71) Applicant: CANON KABUSHIKI KAISHA, Tokyo (JP)

(72) Inventors: Tadanori Saito, Tokyo (JP); Tokuro Nishida, Kanagawa (JP); Kazuya Kitamura, Kanagawa (JP); Takamichi Kosugi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 73 days.

(21) Appl. No.: 17/178,948

(22) Filed: Feb. 18, 2021

(65) Prior Publication Data

US 2021/0266494 A1    Aug. 26, 2021

(30) Foreign Application Priority Data

Feb. 20, 2020  (JP) .............................. JP2020-027417

(51) Int. Cl.
*H04N 5/77*     (2006.01)
*G11B 27/30*    (2006.01)
*G11B 27/34*    (2006.01)

(52) U.S. Cl.
CPC ........... *H04N 5/77* (2013.01); *G11B 27/3036* (2013.01); *G11B 27/34* (2013.01)

(58) Field of Classification Search
CPC ....... H04N 5/77; G11B 27/3036; G11B 27/34
See application file for complete search history.

(56) References Cited

U.S. PATENT DOCUMENTS

| 7,127,576 | B1 * | 10/2006 | Riggs ..................... | G11B 15/02 |
| | | | | 360/71 |
| 9,094,636 | B1 * | 7/2015 | Sanders ................ | H04W 52/38 |
| 2017/0105054 | A1 * | 4/2017 | Bannister ........... | H04N 21/4305 |

FOREIGN PATENT DOCUMENTS

JP     2007-221247 A     8/2007

* cited by examiner

*Primary Examiner* — Mishawn N. Hunter
(74) *Attorney, Agent, or Firm* — Cowan, Liebowitz & Latman, P.C.

(57) ABSTRACT

An electronic apparatus includes an input unit configured to input a time code from an external device, a determination unit configured to determine whether or not a time address of the time code input from the input unit is advancing, a recording unit configured to record a video signal, and a control unit configured to control to cause the recording unit to start recording of the video signal in a case that it is determined by the determination unit that the time address is advancing.

14 Claims, 5 Drawing Sheets

FIG. 2

| LTC BIT NUMBER | CONTENT |
|---|---|
| 0 ~ 3 | FRAME (FIRST DIGIT) |
| 4 ~ 7 | USER BIT AREA 1 |
| 8 ~ 9 | FRAME (TENTH DIGIT) |
| 10 ~ 11 | FLAGS |
| 12 ~ 15 | USER BIT AREA 2 |
| 16 ~ 19 | 1'S IN SECONDS |
| 20 ~ 23 | USER BIT AREA 3 |
| 24 ~ 26 | 10'S IN SECONDS |
| 27 | FLAGS |
| 28 ~ 31 | USER BIT AREA 4 |
| 32 ~ 35 | 1'S IN MINUTES |
| 36 ~ 39 | USER BIT AREA 5 |
| 40 ~ 42 | 10'S IN MINUTES |
| 43 | FLAGS |
| 44 ~ 47 | USER BIT AREA 6 |
| 48 ~ 51 | 1'S IN HOURS |
| 52 ~ 55 | USER BIT AREA 7 |
| 56 ~ 57 | 10'S IN HOURS |
| 58 ~ 59 | FLAGS |
| 60 ~ 63 | USER BIT AREA 8 |
| 64 ~ 79 | LTC SYNC WORDS |

ELECTRONIC APPARATUS AND METHOD OF CONTROLLING THE SAME, AND STORAGE MEDIUM

BACKGROUND OF THE INVENTION

Field of the Invention

The present invention relates to an electronic apparatus having a port for inputting a time code.

Description of the Related Art

In the case where a plurality of electronic apparatuses capable of recording video signals are operated in synchronization with time codes, since recording start and recording stop are usually performed by operating each electronic apparatus by each user, recording start timing and recording stop timing cannot be matched in units of frames. Therefore, even if the total capacity of the recording medium connected to each electronic apparatus is the same, the difference in the remaining capacity is gradually increased by repeating the recording and stopping of the video. Since the bit rate of the video signal tends to increase due to an increase in the resolution of the video signal, an increase in the frame rate, and an increase in the bit depth, it is expected that the difference in the remaining capacity of the recording medium of each electronic apparatus increases.

If all the electronic apparatus are able to record only video signals whose time code is synchronized, a difference will not occur in the remaining capacity of the recording medium of each electronic apparatus, and thus it is possible to prevent that an unsynchronized video signal is recorded. As a result, the user can record only necessary video signals without recording unnecessary video signals, and can effectively utilize the recording medium.

As a method of synchronizing a plurality of electronic apparatuses using a time code, for example, Japanese Patent Laid-Open No. 2007-221247 is cited. In this conventional example, in order to synchronize a time code when a device for processing a video signal is interposed, a time code obtained by adding a processing delay time is added to a video signal that passes through a path where the video signal processing device does not enter.

However, even in the above-mentioned conventional example, there is a problem that the timing of recording start and recording stop cannot be controlled when synchronizing a plurality of electronic apparatuses with time codes.

SUMMARY OF THE INVENTION

The present invention has been made in consideration of the problem described above, and causes electronic apparatuses to record only the video signal in which time code is synchronized when recording a video signal at the same time in a plurality of electronic apparatuses.

According to a first aspect of the present invention, there is provided an electronic apparatus comprising: at least one processor or circuit configured to function as: an input unit configured to input a time code from an external device, a determination unit configured to determine whether or not a time address of the time code input from the input unit is advancing, a recording unit configured to record a video signal, and a control unit configured to control to cause the recording unit to start recording of the video signal in a case that it is determined by the determination unit that the time address is advancing.

According to a second aspect of the present invention, there is provided an electronic apparatus comprising: at least one processor or circuit configured to function as: an input unit configured to input a time code from an external device, an acquisition unit configured to acquire a time address from the time code input from the input unit, a recording unit configured to record a video signal, and a control unit configured to switch between a first mode for adding a time address to the video signal during the time address is advancing and a second mode for adding the time address to the video signal and recording the video signal during the time address is advancing.

According to a third aspect of the present invention, there is provided a method of controlling an electronic apparatus including an input unit configured to input a time code from an external device, the method comprising: determining whether or not a time address of the time code input from the input unit is advancing; recording a video signal; and controlling, in a case that it is determined in the determining that the time address is advancing, to start recording of the video signal in the recording.

According to a fourth aspect of the present invention, there is provided a method of controlling an electronic apparatus including an input unit configured to input a time code from an external device, the method comprising: acquiring a time address from the time code input from the input unit; recording a video signal; and switching between a first mode for adding a time address to the video signal during the time address is advancing and a second mode for adding the time address to the video signal and recording the video signal during the time address is advancing.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
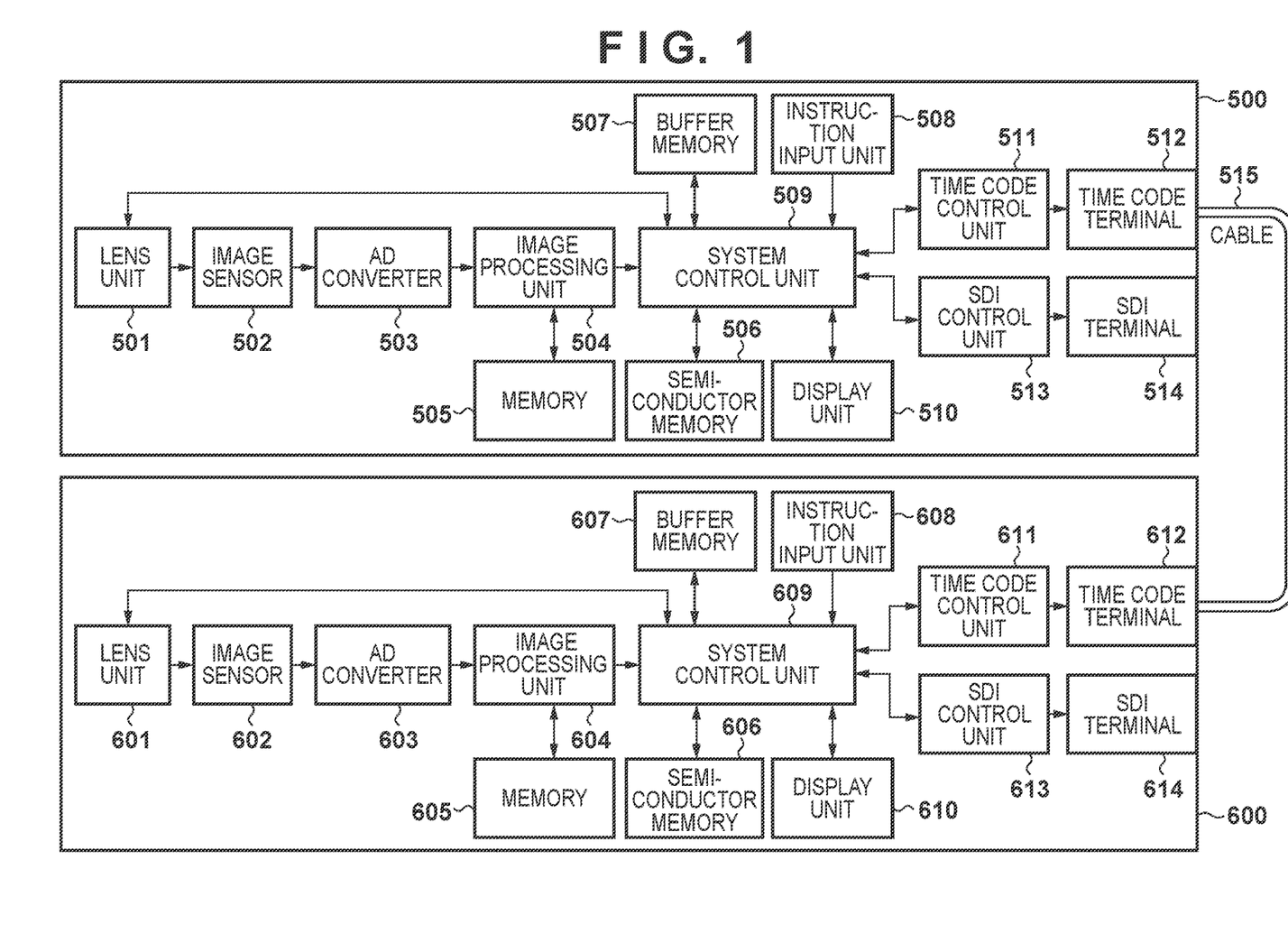
FIG. 1 is a block diagram showing a configuration of a video camera in the first embodiment.

FIG. 1 is a diagram showing a state in which two video cameras are connected, which is a first embodiment of the electronic apparatus of the present invention. Here, it is assumed that two video cameras 500 and 600 are connected by a cable 515. In the present embodiment, the case where the electronic apparatus is a video camera is described, but the electronic apparatus of the present invention may be an electronic apparatus other than the imaging device.

In FIG. 1, the lens unit 501 has an aperture changing function, an angle-of-view changing function, and a focal length changing function to form an optical image of the subject on an imaging surface of the image sensor 502. The image sensor 502 converts the optical image formed by the lens unit 501 into an electrical signal. The AD converter 503 converts the analog image signal output from the image sensor 502 into a digital signal. The image processing unit 504 temporarily stores the video signal from the AD converter 503 in the memory 505 and performs resizing processing such as predetermined pixel interpolation and reduction for the accumulated video signal, and color conversion processing.

The system control unit 509 has compression means for compressing and encoding the image-processed video signal from the image processing unit 504 by a predetermined compression encoding method. The system control unit 509 temporarily stores the video signal compressed by the compression means in the buffer memory 507, then reads out the compressed video signal temporarily stored in the buffer memory 507 as appropriate, and stores it in the semiconductor memory 506 as a recording means. Furthermore, the system control unit 509 communicates with the lens unit 501, and is able to adjust the aperture, the angle of view, and the focal length.

Instruction input unit 508 composed of a switch or a button converts the input from the user into an electrical signal, and notifies the system control unit 509. The captured image and a state of the video camera 500 are displayed on the display unit 510 which is a display device controlled by the system control unit 509.

The time code terminal 512 is an input/output terminal that is set by the time code control unit 511 and is connected to external devices such as other electronic apparatuses or a time code generator. The system control unit 509 can transmit/receive LTC (Linear Time Code) signals of SMPTE standard to/from the external devices via the time code control unit 511. Then, the content of the received LTC signal can be stored as a time code in association with the video signal, or the LTC signal can be created and transmitted from the time code associated with the video signal.

The SDI control unit 513 receives the video signal from the system control unit 509, converts it to the SDI (Serial Digital Interface) signal conforming to SMPTE standard, and outputs it by the SDI terminal 514.

The configuration from the lens unit 601 to the SDI terminal 614 in the video camera 600 is the same as the configuration from the lens unit 501 to the SDI terminal 514 in the video camera 500, respectively, and will not be described.

Considering a case where the time code terminal 512 of the video camera 500 and the time code terminal 612 of the video camera 600 are connected via a cable 515, the video camera 500 transmits an LTC signal from the time code terminal 512, and the video camera 600 receives the LTC signal from the time code terminal 612. The two operations of the "normal mode" and the "mode for recording only when the time address is advancing" in the video camera 600 will be described.

Figure 2:
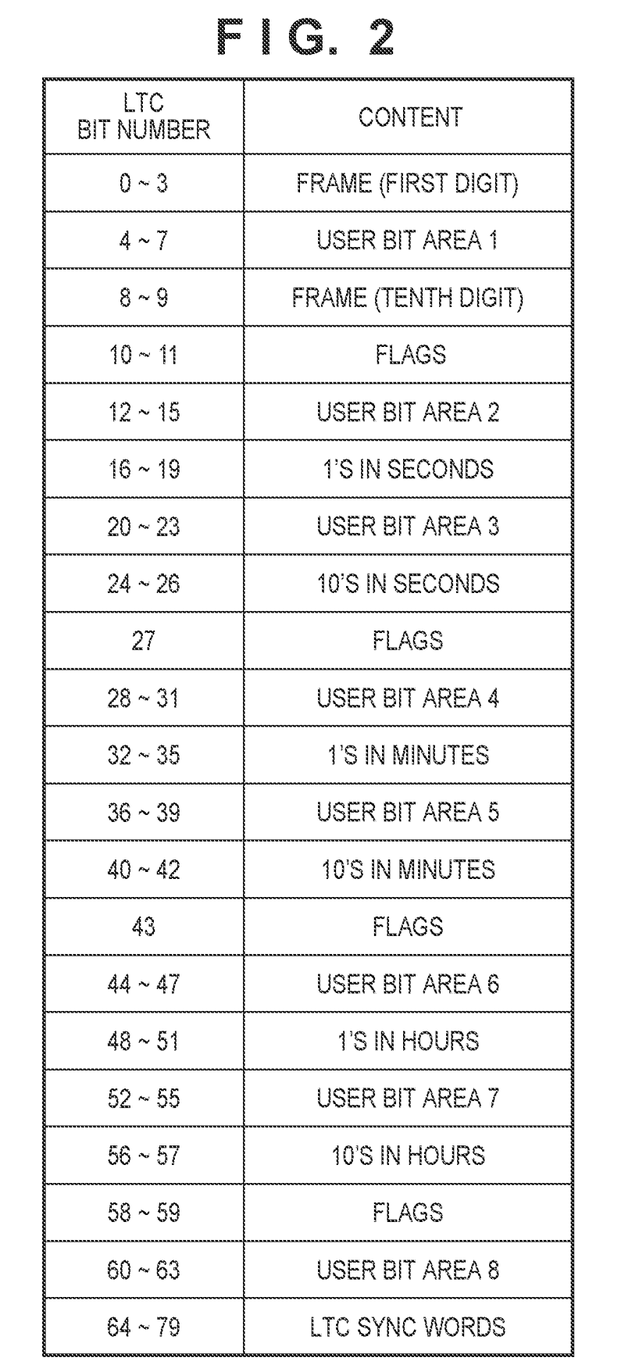
FIG. 2 is a diagram for explaining the contents of each bit of the LTC signal.

First, the details of the LTC signal will be described. The LTC signal is composed of 80 bits per frame. FIG. 2 is a diagram showing the content of each bit.

The LTC bit numbers 0-3 denote the first digit of the frame, 4-7 denote the user bit area 1, and 8-9 denote the tenth digit of the frame. The LTC bit numbers 10-11 represent flags, 12-15 represent user bit area 2, 16-19 represent 1's in seconds, 20-23 represent user bit area 3, 24-26 represent 10's in seconds, and 27 represent flags. The LTC bit numbers 28-31 represent the user bit area 4, 32-35 represent 1's in minutes, 36-39 represent the user bit area 5, 40-42 represent 10's in minutes, 43 represent the flag, and 44-47 represent the user bit area 6. The LTC bit numbers 48-51 represent 1's in hours, 52-55 represent user bit area 7, 56-57 represent 10's in hours, 58-59 represent flags, 60-63 represent user bit area 8, and 64-79 represent LTC sync words.

The time address comprises total 26 bits of LTC bit numbers 0-3, 8-9, 16-19, 24-26, 32-35, 40-42, 48-51, and 56-57. Then, it is possible to express a specific one frame from 00 hours 00 minutes 00 seconds 00 frames to 23 hours 59 minutes 59 seconds 29 frames.

The user bit is composed of 32 bits of LTC bit numbers 4-7, 12-15, 20-23, 28-31, 36-39, 44-47, 52-55, and 60-63, and the user can set any value.

The flag bit is composed of total 6 bits of LTC bit numbers 10-11, 27, 43, and 58-59, and is used to indicate a drop frame, to invert the polarity of an LTC signal, to indicate the attribute of a user bit, and the like.

The sync word comprises LTC bit numbers 64-79 and is used to indicate the frame change. The sync word has a unique pattern that cannot be set in other areas, and has a value of "0011111111111101" in order from the LTC bit number 64. As described above, the LTC signal includes a time address of 26 bits, a user bit of 32 bits, a flag bit of 6 bits, and a sync word of 16 bits.

Figure 3:
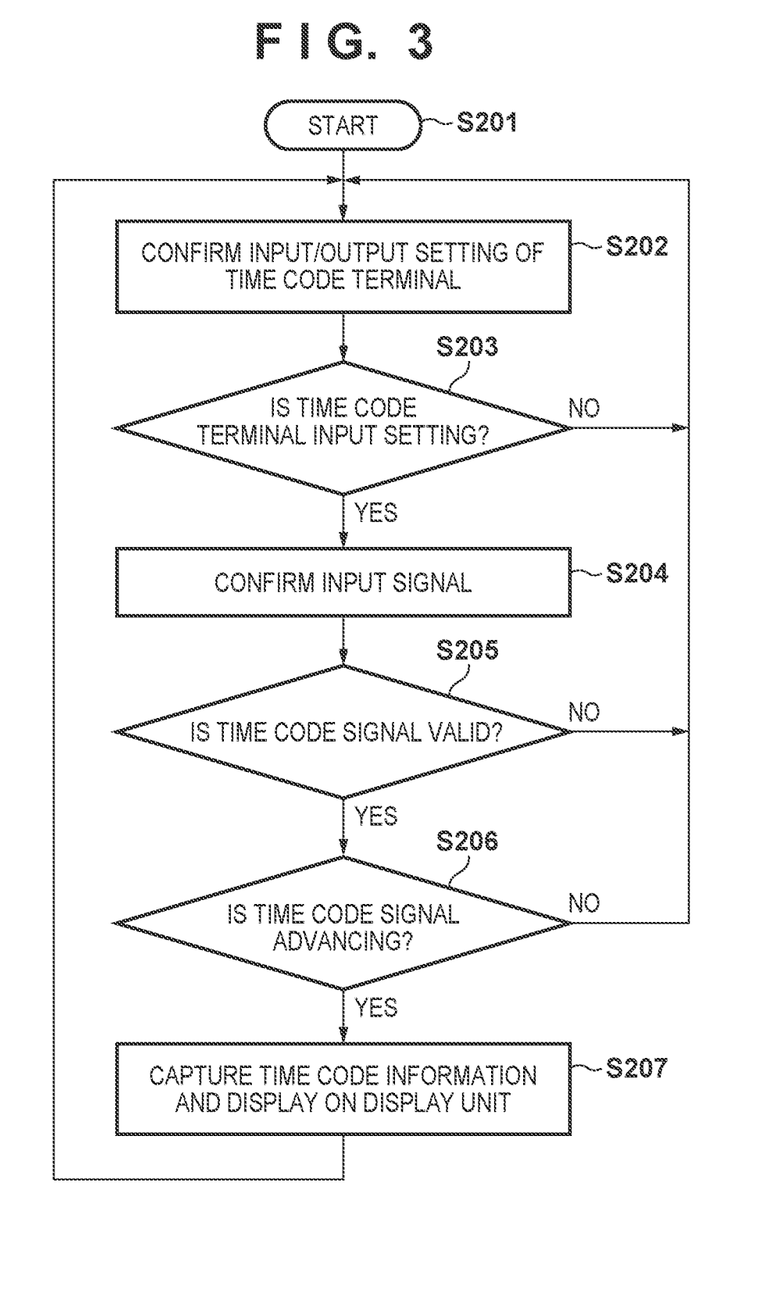
FIG. 3 is a flowchart for explaining the operation of the video camera in the "normal mode" in the first embodiment.

Here, the operation of the "normal mode" of the video camera 600. It is assumed that the time code of the video camera 500 is advancing in a free run and is constantly counted up. FIG. 3 is a flowchart illustrating the operation of the "normal mode" of the video camera 600.

Starting from step S201, in step S202, the system control unit 609 checks the input/output setting of the time code terminal 612 via the time code control unit 611.

In step S203, the system control unit 609 determines whether the time code terminal 612 is set to be input or output based on the check in step S202. The system control unit 609 advances the processing to the step S204 when it is determined that the time code terminal 612 is set to the input. If it is determined that it is not, the processing returns to the step S202.

In the step S204, the system control unit 609 extracts the LTC signal that is input to the time code terminal 612 via the time code control unit 611 and confirms whether the LTC signal conforms to the standard for the LTC signal as described above.

In step S205, the system control unit 609 determines whether the input signal is a valid LTC signal or not. The system control unit 609, when it is determined that the input signal is a valid LTC signal, the process proceeds to step S206, if it is determined that it is not, the process returns to step S202.

In the step S206, the system control unit 609 determines whether or not the time address is advancing from the valid LTC signals of two or more frames. The system control unit 609 advances the processing to the step S207 when it is determined that the time address is advancing, and returns the processing to the step S202 when it is determined that it is not.

In the step S207, the system control unit 609 stores the information of the LTC signal as a time code in the buffer memory 607, displays the acquired time address information on the display unit 610, and returns the process to the step S202.

The flow from step S202 to step S207 is performed for each frame of the video signal. According to the flow described above, the video camera 600 in the "normal mode" can capture the LTC signal as the time code when the input effective LTC signal is advancing.

Figure 4:
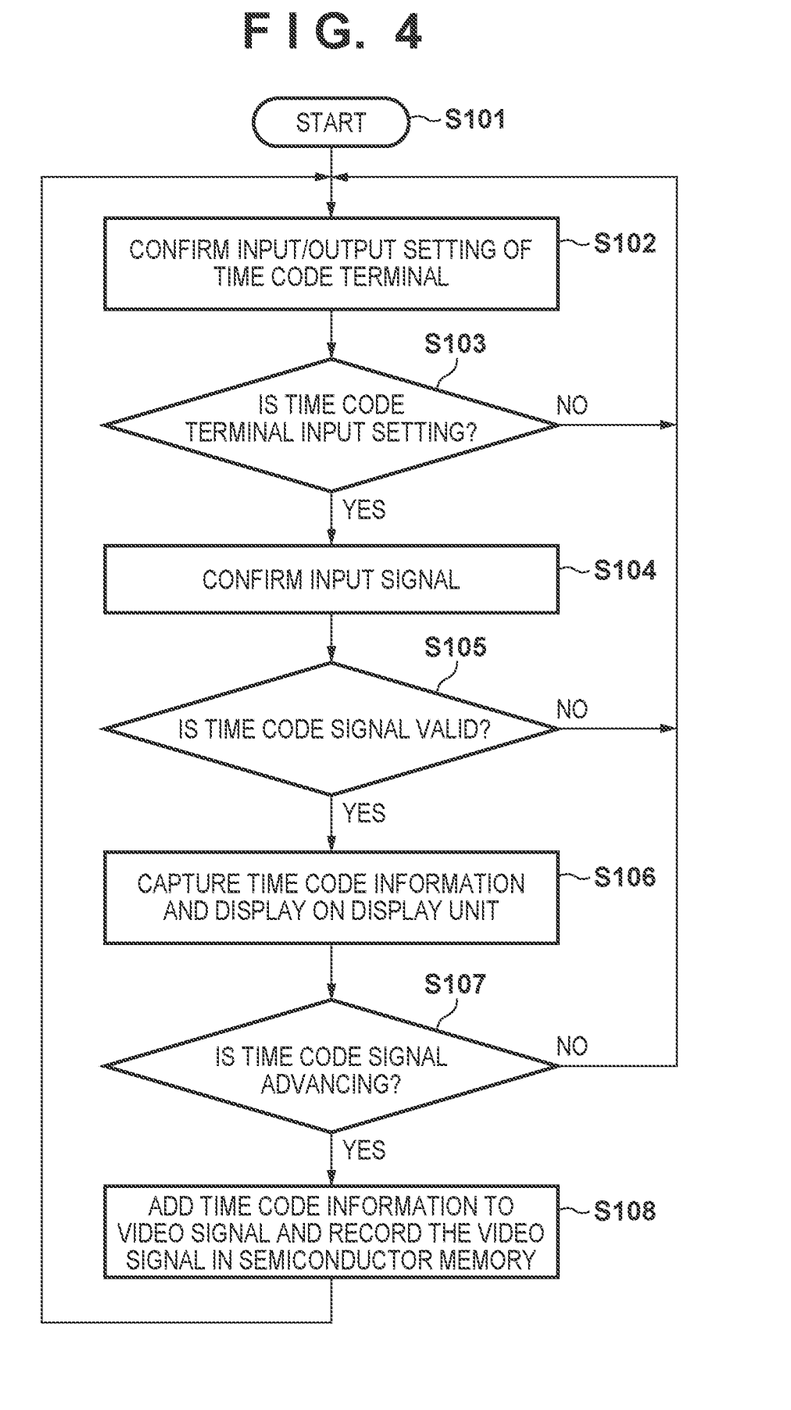
FIG. 4 is a flowchart for explaining the operation of the video camera in the "mode for recording only when the time address is advancing" according to the first embodiment.

FIG. 4 is a flowchart illustrating the operation of the video camera 600 in the mode for recording only when the time address is advancing. The time code of the video camera 500 shall be set to Recrun and shall only be counted up during recording.

Starting from step S101, in step S102, the system control unit 609 checks whether the time code terminal 612 is set to be input or output via the time code control unit 611. The system control unit 609 advances the processing to the step S104 when it is determined that the time code terminal 612 is set to the input. If it is determined that it is not, the processing returns to the step S102.

In the step S104, the system control unit 609 extracts the LTC signal that is input to the time code terminal 612 via the time code control unit 611 and confirms whether the LTC signal conforms to the standard for the LTC signal as described above.

In step S105, the system control unit 609 determines whether the input signal is a valid LTC signal or not. The system control unit 609, when it is determined that the input signal is a valid LTC signal, the process proceeds to step S106, if it is determined that it is not, the process returns to step S102.

In the step S106, the system control unit 609 stores the information of the LTC signal as a time code in the buffer memory 607, and displays the acquired time address information on the display unit 610.

In the step S107, the system control unit 609 determines whether or not the time address is advancing from valid LTC signals of two or more frames. The system control unit 609 advances the processing to the step S108 when it is determined that the time address is advancing, and returns the processing to the step S102 when it is determined that it is not.

In the step S108, the system control unit 609 associates the video signal inputted from the image processing unit 604 with the time code stored in the buffer memory 607 and records the image signal in the semiconductor memory 606, and returns the process to step S102. The flow from the step S102 to S108 is carried out every one frame of the video signal. According to the flow described above, in the "mode for recording only when the time address is advancing", the video camera 600 capture the LTC signal as the time code, and can record the video signal and the time code in association with each other only when the input effective LTC signal is advancing. When the input effective LTC signal is not advancing, the video signal is not recorded and only the LTC signal is captured as a time code.

In the video camera 600 set to the "mode for recording only when the time address is advancing", it is preferable that the recording of the video signal is invalidated even if the user instructs the recording of the video signal to start via the instruction input unit 608, in order to maintain the synchronization of the time code with the video camera 500. Since the LTC signal is a signal in one direction from the video camera 500 to the video camera 600, even if the recording is started in the video camera 600 by a user operation and time code advances, the video camera 500 cannot acquire the time code information of the video camera 600. As a result, the synchronization of the time codes of the video camera 500 and the video camera 600 cannot be maintained. Therefore, the video camera 600 is set to be disable the recording start operation. Since the recording start operation is invalidated during the recording mode is set to the "mode for recording only when the time address is advancing", it is preferable to display the fact that the video camera 600 is set to the "mode for recording only when the time address is advancing" on the display unit 610 so as to be distinguishable and notify the user thereof.

In the video camera 600, switching between the "normal mode" and the "mode for recording only when the time address is advancing" is performed by the user using the instruction input unit 608, and based on this, the system control unit 609 performs mode setting. Alternatively, a method of switching the mode of the video camera 600 from the video camera 500 using the user bits of the LTC signal described above is also contemplated.

The user sets a specific user bit in the video camera 500 in order to switch the video camera 600 to the "mode for recording only when the time address is advancing", and the LTC signal is output from the time code terminal 512. In the video camera 600, an LTC signal in which the specific user bit is set is input via the time code terminal 612, and when the system control unit 609 recognizes the specific user bit, the video camera 600 is switched from the "normal mode" to the "mode for recording only when the time address is advancing". Further, when it is set to other than a specific user bit, the system control unit 609 switches the video camera 600 from the mode for recording only when the time address is advancing to the normal mode. This technique allows the user to switch between the "normal mode" and the "mode for recording only when the time address is advancing" in the video camera 600 without operating the video camera 600.

Second Embodiment

In the first embodiment, it is assumed that the two video cameras, which are examples of the electronic apparatus, are connected to each other by a cable and the time codes are synchronized by two devices, but in the second embodiment, it is considered that the time codes are synchronized in three or more electronic apparatuses.

Figure 5:
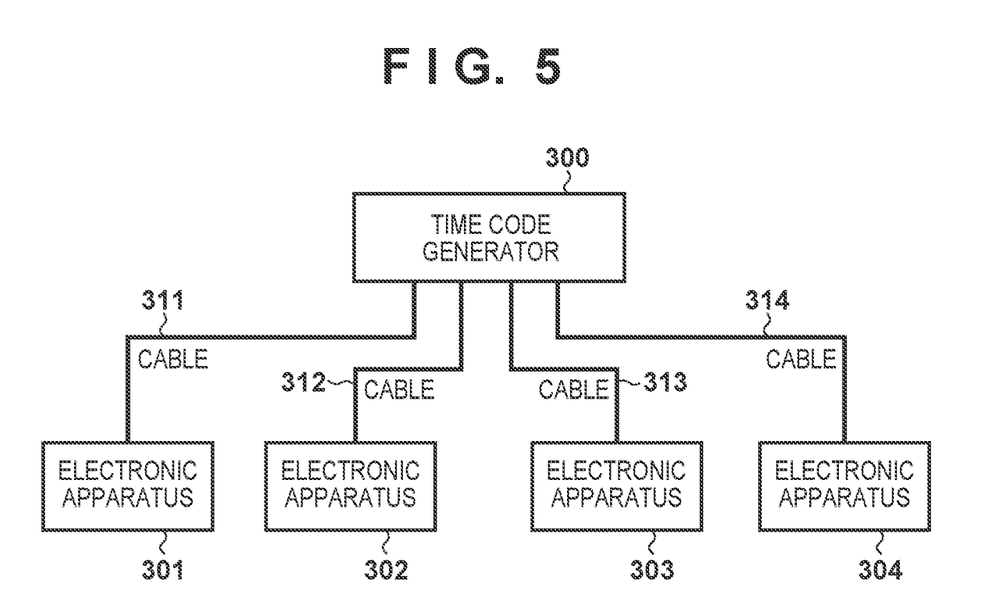
FIG. 5 is a diagram for explaining a method of connecting devices according to the second embodiment.

FIG. 5 is a diagram showing a connection state of devices in the second embodiment. The time code generator 300 is connected to the electronic apparatus 301 via a cable 311, and similarly connected to the electronic apparatus 302 via a cable 312, the electronic apparatus 303 via a cable 313, and the electronic apparatus 304 via a cable 314. The electronic apparatuses 301 to 304 have the same configuration as that of the video camera 600 described in the first embodiment, and a detailed description thereof is omitted.

The time code generator 300 may freely generate LTC signal by external operation and transmit the same LTC signal to the electronic apparatuses 301-304. The user operates the time code generator 300 to advance the LTC signal at a timing at which the recording of the video signal is desired to start, and to stop the advancement of the LTC signal at a timing at which the recording of the video signal is desired to stop.

The operation flow of the electronic apparatuses 301 to 304 is similar to that of the first embodiment shown in FIG. 4. That is, in the case where the electronic apparatuses 301 to 304 are set to the "mode for recording only when the time address is advancing", and in the case where an advancing effective LTC signal is output from the time code generator 300, the time code and the video signal input to the electronic apparatuses 301 to 304 are recorded in association with each other. In addition, if the input valid LTC signal is not advancing, the electronic apparatuses 301 to 304 simply capture the LTC signal as a time code and do not record the video signal.

As described above, according to the present embodiment, it is possible to record only video signals to which synchronized time codes are allocated in all electronic apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-027417, filed Feb. 20, 2020, which is hereby incorporated by reference herein in its entirety.

What is claimed is:

1. An electronic apparatus comprising:
at least one processor or circuit configured to function as:
an input unit configured to input a time code from an external device;
a determination unit configured to determine whether or not a time address of the time code input from the input unit is advancing;
a recording unit configured to record a video signal; and
a control unit configured to control the recording unit to start recording the video signal in a case where it is determined by the determination unit that the time address is advancing,
wherein the control unit causes the recording unit to stop recording the video signal in response to a stop in the advancing of the time address.

2. The electronic apparatus according to claim 1, wherein the recording unit records the video signals and the time address in association with each other.

3. The electronic apparatus according to claim 1, further comprising an image capturing device configured to perform image capturing and generate the video signal.

4. The electronic apparatus according to claim 3, wherein the electronic apparatus is a video camera.

5. The electronic apparatus according to claim 1, wherein the at least one processor or circuit is further configured to function as an acceptance unit configured to accept a user's operation,
wherein the control unit, if an instruction for starting recording of a video is issued by the acceptance unit, invalidates the instruction.

6. An electronic apparatus comprising:
at least one processor or circuit configured to function as:
an input unit configured to input a time code from an external device,
an acquisition unit configured to acquire a time address from the time code input from the input unit,
a recording unit configured to record a video signal, and
a control unit configured to switch between a first mode for adding a time address to the video signal while the time address is advancing and a second mode for adding the time address to the video signal and recording the video signal while the time address is advancing.

7. The electronic apparatus according to claim 6, wherein the at least one processor or circuit is further configured to function as an acceptance unit configured to accept a user's operation,
wherein the control unit, in the second mode, if an instruction for starting recording of a video is issued by the acceptance unit, invalidates the instruction.

8. The electronic apparatus according to claim 6, further comprising:
a display device configured to display a state of the electronic apparatus, wherein in the second mode, the control unit causes the display device to display an indicator from which a user can identify the second mode.

9. The electronic apparatus according to claim 6, further comprising:
an image capturing device configured to perform image capturing and generate the video signal.

10. The electronic apparatus according to claim 9, wherein the electronic apparatus is a video camera.

11. A method of controlling an electronic apparatus including an input unit configured to input a time code from an external device, the method comprising:
determining whether or not a time address of the time code input from the input unit is advancing;
recording a video signal; and
controlling to, in a case where it is determined that the time address is advancing, start the recording of the video signal,
wherein during the controlling, the recording of the video signal is stopped in response to a stop in the advancing of the time address.

12. A method of controlling an electronic apparatus including an input unit configured to input a time code from an external device, the method comprising:
acquiring a time address from the time code input from the input unit;
recording a video signal; and switching between a first mode for adding a time address to the video signal while the time address is advancing and a second mode for adding the time address to the video signal and recording the video signal while the time address is advancing.

13. A non-transitory computer readable storage medium storing a program causing a computer to execute a method of controlling an electronic apparatus including an input unit configured to input a time code from an external device, the method comprising:
   determining whether or not a time address of the time code input from the input unit is advancing;
   recording a video signal; and
   controlling to, in a case where it is determined that the time address is advancing, start the recording of the video signal,
   wherein during the controlling, the recording of the video signal is stopped in response to a stop in the advancing of the time address.

14. A non-transitory computer readable storage medium storing a program causing a computer to execute a method of controlling an electronic apparatus including an input unit configured to input a time code from an external device, the method comprising:
   acquiring a time address from the time code input from the input unit;
   recording a video signal; and
   switching between a first mode for adding a time address to the video signal while the time address is advancing and a second mode for adding the time address to the video signal and recording the video signal which the time address is advancing.

* * * * *